(12) United States Patent
Hernandez Marti et al.

(10) Patent No.: US 11,639,662 B2
(45) Date of Patent: May 2, 2023

(54) POWER AND COMMUNICATIONS CABLE FOR COILED TUBING OPERATIONS

(71) Applicant: Halliburton Energy Services, Inc., Houston, TX (US)

(72) Inventors: Ramon Hernandez Marti, Houston, TX (US); Luis San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 478 days.

(21) Appl. No.: 16/812,469

(22) Filed: Mar. 9, 2020

(65) Prior Publication Data
US 2020/0211735 A1 Jul. 2, 2020

Related U.S. Application Data

(62) Division of application No. 16/007,668, filed on Jun. 13, 2018, now Pat. No. 10,971,284.

(Continued)

(51) Int. Cl.
*E21B 47/13* (2012.01)
*H01B 9/02* (2006.01)
(Continued)

(52) U.S. Cl.
CPC ............ *E21B 47/13* (2020.05); *E21B 17/003* (2013.01); *E21B 17/20* (2013.01); *E21B 17/206* (2013.01); *G02B 6/443* (2013.01); *H01B 7/18* (2013.01); *H01B 7/2806* (2013.01); *H01B 9/005* (2013.01); *H01B 9/02* (2013.01); *H01B 11/18* (2013.01); *H01B 11/22* (2013.01); *E21B 47/06* (2013.01); *E21B 47/07* (2020.05); *G02B 6/50* (2013.01); *H01B 1/02* (2013.01); *H01B 7/046* (2013.01);
(Continued)

(58) Field of Classification Search
CPC ...... E21B 17/003; E21B 17/20; E21B 17/206; E21B 47/13; G02B 6/50; H02G 9/06; H02G 11/02; H01B 7/046; H01B 7/04
See application file for complete search history.

(56) References Cited

U.S. PATENT DOCUMENTS

| 2,180,731 A | 11/1939 | Dickinson |
| 2,800,524 A | 7/1957 | Lear |

(Continued)

OTHER PUBLICATIONS

The Permeability of Hydrogen in aluminum, copper, iron, gold, kovar, niobium, REB Research and Consulting, 1997, REB Research and Consulting.

*Primary Examiner* — Caroline N Butcher
(74) *Attorney, Agent, or Firm* — K&L Gates LLP (57) ABSTRACT

A power and communications cable may include an electromagnetic waveguide, an inner metallic tubular surrounding the electromagnetic waveguide, an electrically conductive material surrounding the inner metallic tubular, an electrically insulating material surrounding the electrically conductive material, and an outer metallic tubular resistant to corrosion and abrasion surrounding the electrically insulating layer. The example system may include an electrical device locatable in the wellbore and coupleable to the cable and a control unit coupleable to the cable and operable to supply power to and communicate with the electrical device via the power and communications cable.

4 Claims, 4 Drawing Sheets

Related U.S. Application Data (60) Provisional application No. 62/525,562, filed on Jun. 27, 2017.

(51) Int. Cl.

| | | |
|---|---|---|
| *H01B 9/00* | (2006.01) | |
| *H01B 11/22* | (2006.01) | |
| *H01B 7/18* | (2006.01) | |
| *G02B 6/44* | (2006.01) | |
| *H01B 1/02* | (2006.01) | |
| *H02G 9/06* | (2006.01) | |
| *H01B 7/04* | (2006.01) | |
| *H01B 7/28* | (2006.01) | |
| *H01B 11/18* | (2006.01) | |
| *E21B 17/20* | (2006.01) | |
| *E21B 17/00* | (2006.01) | |
| *E21B 47/06* | (2012.01) | |
| *G02B 6/50* | (2006.01) | |
| *H02G 11/02* | (2006.01) | |
| *E21B 47/07* | (2012.01) | |

(52) U.S. Cl.
CPC ............... *H01B 9/003* (2013.01); *H02G 9/06* (2013.01); *H02G 11/02* (2013.01)

(56) References Cited

U.S. PATENT DOCUMENTS

| | | |
|---|---|---|
| 3,023,267 A | 2/1962 | Solomon |
| 3,541,473 A | 11/1970 | Schlicke |
| 3,591,704 A | 7/1971 | Ebel |
| 3,651,244 A | 3/1972 | Silver |
| 3,707,595 A | 12/1972 | Plate |
| 3,710,859 A | 1/1973 | Hanes |
| 3,790,697 A | 2/1974 | Buckingham |
| 3,829,603 A | 8/1974 | Hansen |
| 3,885,085 A | 5/1975 | Bahder |
| 3,889,049 A | 6/1975 | Legg |
| 3,943,271 A | 3/1976 | Bahder |
| 4,016,942 A | 4/1977 | Wallis |
| 4,183,621 A | 1/1980 | Kao |
| 4,347,487 A | 8/1982 | Martin |
| 4,472,597 A | 9/1984 | Uematsu |
| 4,486,721 A | 12/1984 | Cornelius |
| 4,533,789 A | 8/1985 | Katz |
| 4,538,022 A | 8/1985 | Barnicol-oettler |
| 4,579,420 A | 4/1986 | Winter |
| 4,665,281 A | 5/1987 | Kamis |
| 4,688,888 A | 8/1987 | Kimmich |
| 4,936,648 A | 6/1990 | Yamaguchi et al. |
| 4,963,695 A | 10/1990 | Marciano-agostinelli |
| 5,010,209 A | 4/1991 | Marciano-agostinelli |
| 5,013,127 A | 5/1991 | Bernard |
| 5,281,757 A | 1/1994 | Marin |
| 5,300,733 A | 4/1994 | Uematsu |
| 5,493,626 A * | 2/1996 | Schultz ............... G02B 6/4427 385/12 |
| 5,894,104 A | 4/1999 | Hedberg |
| 5,930,431 A | 7/1999 | Lail |
| 6,049,647 A | 4/2000 | Register |
| 6,298,917 B1 | 10/2001 | Kobylinski |
| 6,310,286 B1 | 10/2001 | Troxel |
| 6,404,961 B1 | 6/2002 | Bonja |
| 6,515,592 B1 | 2/2003 | Babour |
| 6,621,966 B2 | 9/2003 | Lail |
| 6,671,441 B1 | 12/2003 | Bocanegra |
| 6,907,710 B2 | 6/2005 | Trundle |
| 6,960,724 B2 | 11/2005 | Orlet et al. |
| 7,108,062 B2 | 9/2006 | Castano-mears |
| 7,493,962 B2 | 2/2009 | Sheffield |
| 8,312,923 B2 | 11/2012 | Patel |
| 9,175,560 B2 | 11/2015 | Algeroy |
| 2003/0024704 A1 | 2/2003 | Hirsch |
| 2004/0197057 A1 | 10/2004 | Lee |
| 2006/0221768 A1 | 10/2006 | Hall |
| 2008/0041596 A1 | 2/2008 | Blount |
| 2010/0215326 A1 | 8/2010 | Zediker |
| 2012/0031607 A1 | 2/2012 | Lahijani |
| 2014/0327552 A1 | 11/2014 | Filas |
| 2015/0083459 A1 | 3/2015 | Nagahashi |
| 2015/0090487 A1 | 4/2015 | Efraimsson |
| 2015/0132159 A1 | 5/2015 | Wilson |
| 2016/0064116 A1 | 3/2016 | Nielsen |
| 2016/0078981 A1 | 3/2016 | Kumada |
| 2016/0217888 A1 | 7/2016 | Xiang |
| 2016/0225488 A1 | 8/2016 | Pon |
| 2017/0027090 A1 | 1/2017 | Sumi |
| 2017/0149406 A1 | 5/2017 | Spiel |
| 2017/0184804 A1* | 6/2017 | Lowell ............... H01B 7/046 |

* cited by examiner

POWER AND COMMUNICATIONS CABLE FOR COILED TUBING OPERATIONS

BACKGROUND

This section is intended to provide relevant background information to facilitate a better understanding of the various aspects of the described embodiments. Accordingly, it should be understood that these statements are to be read in this light and not as admissions of prior art.

Coiled tubing refers to relatively flexible, continuous tubing that can be run into the wellbore from a large spool which may be mounted on a truck or other support structure. Coiled tubing may be used in a variety of wellbore servicing operations including drilling operations, completion operations, stimulation operations, production operations, etc. Coiled tubing may also be used to inject fluids, which can be abrasive and/or corrosive, at high pressures to perforate the formation, fracture the formation, remove scale from production tubing or downhole equipment, or perform other suitable fluid injection operations. Electrical instruments (e.g., video cameras, pressure sensors, temperature sensors, etc.) can provide real-time access to downhole conditions to monitor coiled tubing operations. The electrical instruments may rely on electrical power and communications to receive commands and transmit measurements and other information to the surface. One method of providing power and communications to the electrical instruments deployed via coiled tubing is employing a cable, which carries fiber optic and electrical cables, inside the coiled tubing.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Systems and methods of the disclosed embodiments may include a power and communications cable that can withstand the abrasive, corrosive fluid and high pressures (up to 15,000 psi/$10^8$ Pascals) encountered inside the coiled tubing. Embodiments of the cable may use waveguides to transmit certain signals (e.g., sensor measurements from downhole tools to an uphole control unit, or vice versa) while surrounding layers of the cable are used to protect the waveguides. These surrounding layers may also be used to transmit power for operation of downhole tools, and telemetry signals to receive and transmit commands to other communication targets. Thus, embodiments of the cable may provide the benefits of withstanding pressure, resisting abrasion, resisting corrosion, and conducting power and telemetry signals downhole.

Figure 1:
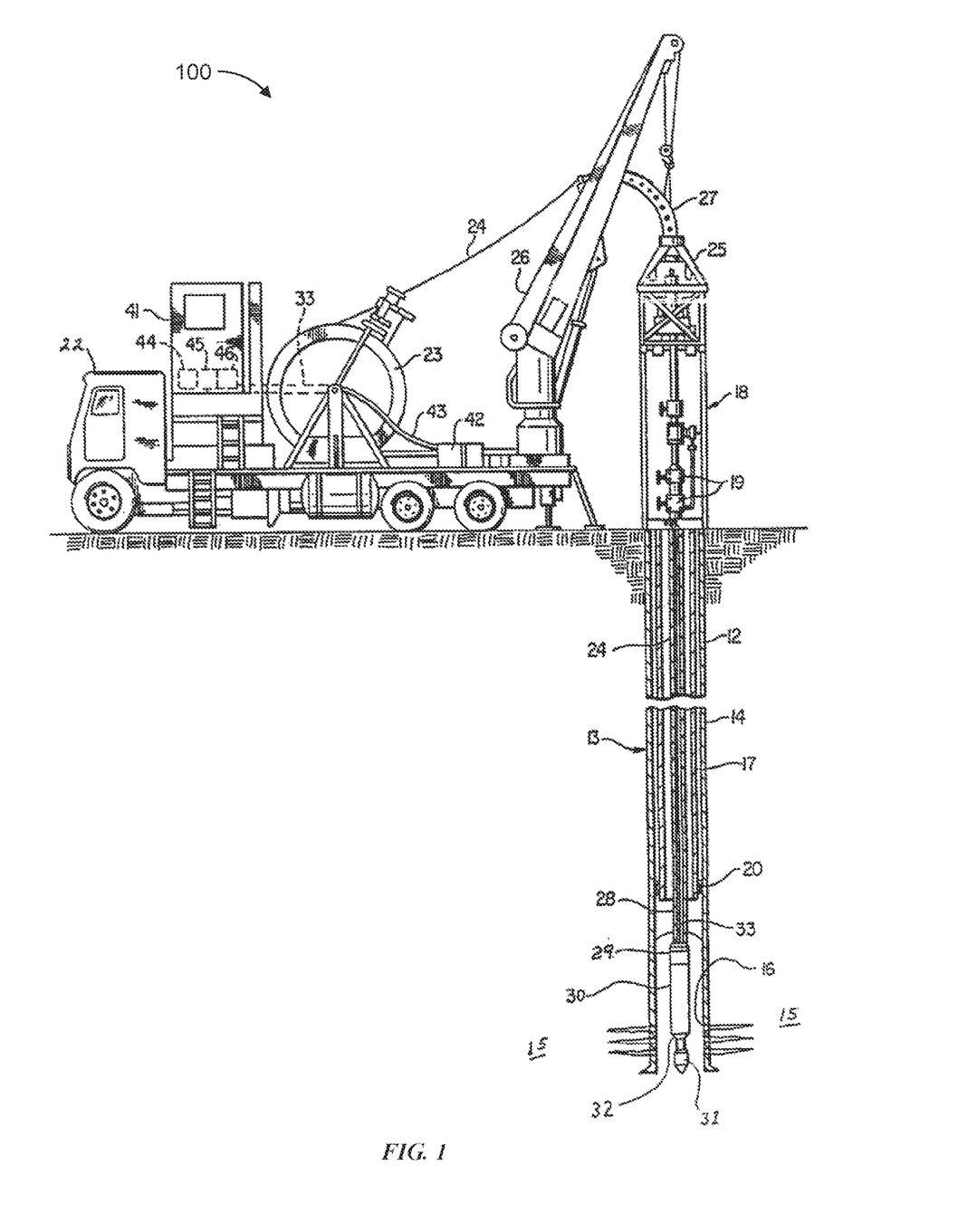
FIG. 1 is a schematic diagram of a coiled tubing system deployed in a wellbore intersecting a subterranean formation, according to one or more embodiments.

FIG. 1 is a schematic diagram of a coiled tubing system 100 in accordance with one or more embodiments. As shown, a wellbore 12 forms part of a completed production well 13 which includes a casing 14 extending from the surface to the production formation 15 of the well. The production formation 15 may be several thousand feet into the earth, under intense pressure and heat with production fluids of hydrocarbons in reserve to be extracted. The casing 14 includes a plurality of perforations 16 formed in the wall thereof to allow the influx of the production fluids from the producing formation into the wellbore for removal at the wellhead. A production packer 20 is positioned between a string of production tubing 17 and the casing 14 above the production formation 15. Although FIG. 1 depicts the coiled tubing system 100 employed in a production operation, it should be appreciated that the coiled tubing system 100 may be used in a variety of oil and gas servicing operations, including drilling operations, intervention operations, completion operations, and stimulation operations. The coiled tubing system 100 may also be used in offshore applications where the coiled tubing system 100 is employed on an offshore vessel (not shown).

The string of production tubing 17 extends from the wellhead production completion equipment 18, for example, a "christmas tree," to allow the production fluids flowing into the casing 14 from the formation to be received at the surface for collection of production fluids from the well. The various valves 19 at the completion equipment 18 control the flow of production fluids brought to the surface through the tubing.

The coiled tubing system 100 comprises a truck 22 having a mechanically operated coil 23. A continuous length of coiled tubing 24 capable of withstanding relative high pressures (e.g., up to 15,000 psi or above) is wound around the coil 23. The tubing 24 is slightly flexible so as to be able to allow coiling of the tubing onto the coil 23. A hydraulic crane 26 suspends a coiled tubing injector 25 over the completion equipment 18. The injector 25 includes a curved guideway 27 and a hydraulic injector that injects the coiled tubing 24 down into the well tubing 17 while the well remains under production pressure. The injector 25 injects enough tubing 24 into the production tubing 17 that an inspection tool 30 attached to an end 28 of the tubing 24 protrudes from the production tubing 17 and into the region of the wellbore inside the casing 14.

The inspection tool 30 includes an electrical device 29 that is used to detect temperature or pressure, or to take other readings of conditions or conduct other downhole operations. A power and communications cable 33 extends longitudinally inside or outside the coiled tubing 24 and is used in connecting the electrical device 29 with a control unit 44 as further described herein. The coiled tubing 24 conducts injection fluids from the truck 22 to a location within the wellbore 12 that is selected by the positioning of an injection nozzle 32. The fluid may be injected into the wellbore 12 under pressurized conditions to perform an operation such as treating the formation 15. The injection fluid may also contain abrasive and corrosive chemicals and/or additives. The additives may corrode and abrade the components of the system 100 as well as the formation 15, and thus the power and communications cable 33 may experience high pressures as well as corrosive and abrasive conditions.

The power and communications cable 33 is coupled to one or more electrical devices 29, such as a sensor 31, positioned in the wellbore 12. The electrical device 29 may include additional or alternative sensors for monitoring downhole conditions, such as a video imaging sensor, a pressure sensor, a temperature sensor, etc. It should be appreciated that the sensor 31 is a non-limiting example of an electrical device 29 positioned in the wellbore 12. The power and communications cable 33 may be coupled to various electronic or electrical devices used for drilling operations, completion operations, stimulation operations, production operations, logging operations, etc.

The power and communications cable 33 has protective components that ensure the signals from the control unit 44 communicate to the electrical device 29. For example, the power and communications cable 33 may include a coaxial cable for high frequency data communications. Additionally or alternatively, electromagnetic waveguides (such as fiber optic cables) may be used to improve the capacity of transmittable data and also reduce the diameter and weight of the cable 33.

The coiled tubing system 100 also includes an operator control housing 41 and a pair of pumps 42 connected to the upper end 43 of the coiled tubing 24 to pressurize the injection fluids into the coiled tubing 24 from the surface. The pumps 42 are connected to a supply fluid (not shown). The control unit 44 may be located within the operator housing 41 and controls the operation of the pumps 42 and the electrical device 29 (e.g., the sensor device 31) positioned in the wellbore 12. The power and communications cable 33 extends longitudinally along the coiled tubing 24 (e.g., inside or outside of the coiled tubing 24) and is connected to the control unit 44, which includes an input device 45 (e.g., a keypad, keyboard, touchpad, mouse, touchscreen, etc.) and output device 46 (e.g., a display, printer, touchscreen, etc.). The coiled tubing system 100 also includes the equipment required to seal off the fluid in the tubing from the cable connections, convert the optical signal to an electrical signal, and communicate that signal to the control unit 44. The power and communications cable 33 is used to carry both electrical power and communication signals downhole from the control unit 44 to power the electrical device 29 positioned in the wellbore 12 as well as carry communication signals uphole from the electrical device 29 to the control unit 44.

Figure 2A:
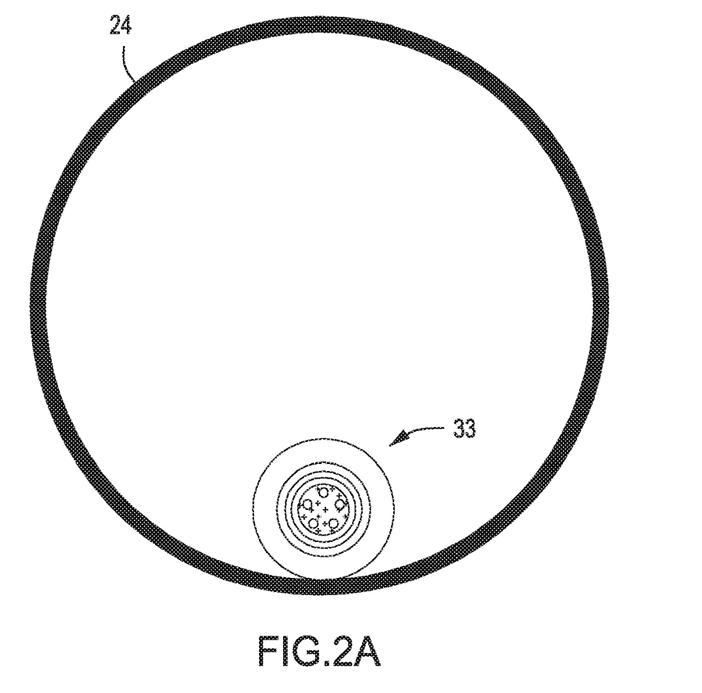
FIGS. 2A-D are cross-sectional views of a power and communications cable positioned along the coiled tubing, according to one or more embodiments.
Figure 2B:
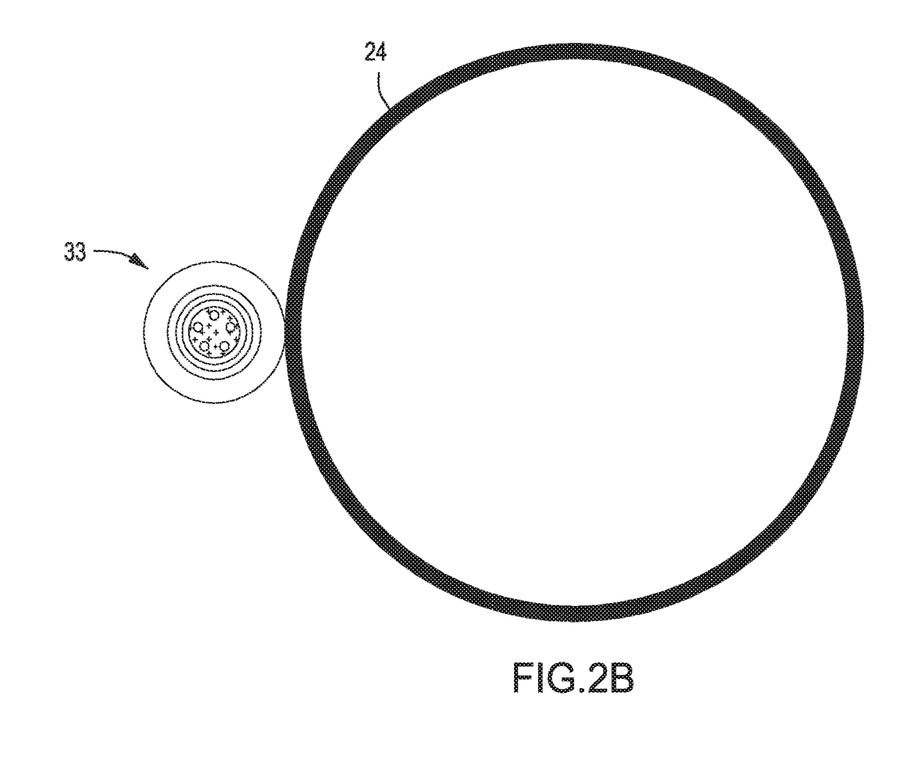

FIGS. 2A and 2B are cross-sectional views (not to scale) of the power and communications cable 33 positioned inside or outside of the coiled tubing (schematically depicted at 24), in accordance with one or more embodiments. As shown in FIG. 2A, the cable 33 may be positioned inside extending longitudinally along the coiled tubing 24. The cable 33 may be mechanically and electrically coupled to the coiled tubing in any suitable manner such as by welding, brazing, soldering, mechanically fastening, or adhesive bonding the cable 33 to the coiled tubing 24. The cable 33 may be integrated with and coupled to the coiled tubing 24 while the coiled tubing 24 is being manufactured. The cable 33 may also be positioned inside the coiled tubing 24 by pulling the cable 33 through the coiled tubing 24 with or without being coupled to the interior of the coiled tubing 24. As shown in FIG. 2B, the cable 33 may be positioned on the outside extending longitudinally along the coiled tubing 24 and coupled to the coiled tubing 24 while the coiled tubing 24 is injected into the wellbore 12 with the coiled tubing injector 25.

Figure 2C:
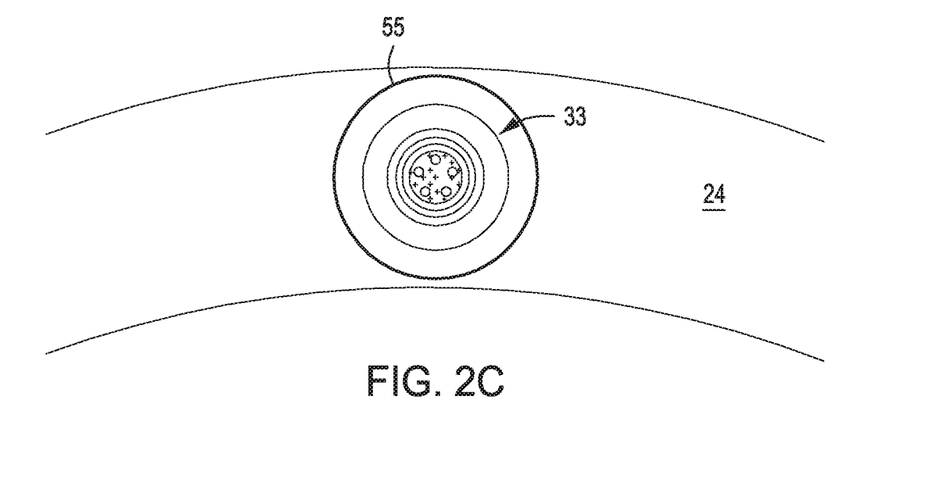
Figure 2D:
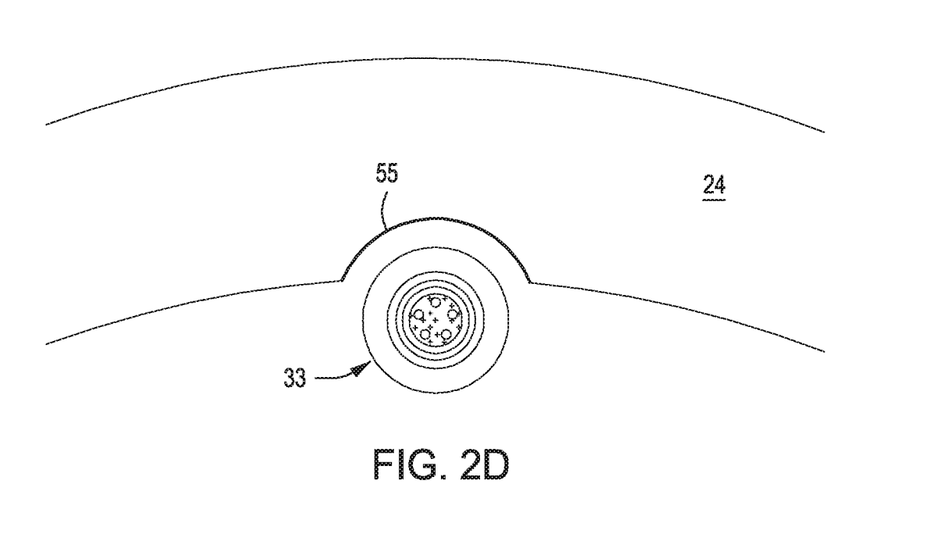

FIGS. 2C and 2D are cross-sectional views (not to scale) of optional example embodiments in which the coiled tubing 24 has a predefined channel or cable guide indicated in both figures at 55, which may be formed during manufacturing of the coiled tubing 24, to at least partially position, guide, and/or secure the cable 33 to the coiled tubing 24. Although the cable guide examples are illustrated as arcuate channels for receiving a generally circular cable 33, any other shapes or configurations are within the scope of this disclosure. As shown in FIG. 2C, the cable guide 55 may be an enclosed or partially enclosed channel formed in the wall of the coiled tubing 24 to enclose the cable 33. As shown in FIG. 2D, the cable guide 55 may only partially encircle the cable 33, leaving a portion exposed either interior (or optionally exterior) to the coiled tubing 24.

Figure 3:
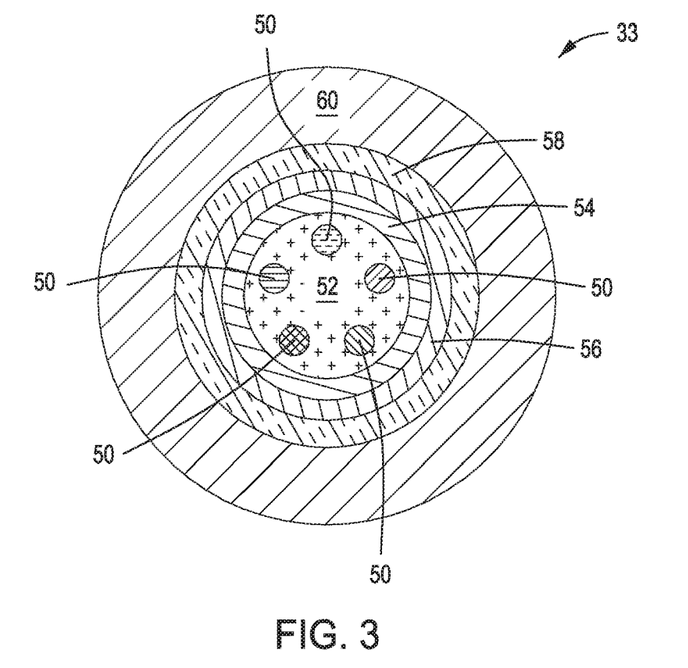
FIG. 3 is a cross-sectional view of the power and communications cable, according to one or more embodiments.

FIG. 3 shows a cross-section view of the power and communications cable 33, in accordance with one or more embodiments. As shown, the cable 33 includes one or more electromagnetic waveguides 50, such as fiber optic cables, extending longitudinally inside an inner metallic tubular 54, which may be made of steel, and held in position by a potting material 52, including a silicone gel or epoxy. The inner metallic tubular 54 and the electromagnetic waveguides 50 may be formed as an assembly referred to as fiber in metal tube (FIMT). The electromagnetic waveguides 50 facilitate communications between downhole electrical equipment and the surface. The electromagnetic waveguides 50 may be used to carry measurements of downhole conditions taken by the electrical equipment positioned in the wellbore 12 or carry command signals from the surface to the electrical equipment positioned in the wellbore 12. The electromagnetic waveguides 50 may include single mode or multimode fiber optic cables.

While some sensors may communicate with the control unit 44 through the electromagnetic waveguides 50, the cable 33 further comprises components that comprise a plurality of concentric layers bonded, joined, and/or otherwise tightly bound. To supply power or provide another communications channel to the electrical device 29, the cable 33 may include an electrically conductive material 56 surrounding the inner metallic tubular 54. For example, the conductive material 56 may include a conductive tape (e.g., copper tape). The conductive tape may be wound around the inner metallic tubular 54 without overlapping itself. The electrical conductive material 56 over metallic tubular 54 may present a current carrying cross section equivalent to size 10 of the American Wire Gauge (AWG).

The cable 33 may further include an electrically insulating layer 58 surrounding the electrically conductive material 56 to electrically separate the inner metallic tubular 54 and the conductive material 56 from further conductive paths within the cable 33. As a non-limiting example, the electrically insulating layer 58 may include a fluorinated ethylene propylene (FEP), poly-tetrafluoroethylene (PTFE), ethylene-tetrafluoroethylene (ETFE), or other fluoropolymers.

The outermost concentric layer of the cable 33 may be an outer metallic tubular 60. The outer metallic tubular 60 provides protection from the pressure and abrasion that may be present within and without the coiled tubing 24. As an additional benefit, the outer metallic tubular 60 may provide a conductive return path for the electric power signal or communication signal that propagates through the cable 33. The electrically insulating layer 58, the electrically conductive material 56, and the inner metallic tubular 54 may fill the volume within the outer metallic tubular 60. To fit within the coiled tubing 24, the outer metallic tubular 60 may have an outer diameter (OD) of 3 to 6 millimeters, for example 4 millimeters, but may also have a larger diameter, e.g., up to 18 millimeters. The values of resistance described herein correspond to the cable 33 having an outer diameter of 4 millimeters.

The outer metallic tubular 60 may include a corrosion and abrasion resistant alloy including a nickel alloy referred to as Nickel Alloy 825 or a steel alloy referred to as Steel Alloy 316L. Corrosion and abrasion resistant means that the alloy may contact corrosive influences such as sour gas ($H_2S$) without corroding. The nickel alloy of the outer metallic tubular 60 may be a composition of metals comprising 38% to 46% of nickel, at least 22% of iron, 19% to 23.5% of chromium, 2.5% to 3.5% of molybdenum, 1.5 to 3% of copper, at most 1% of manganese, and 0.6 to 1.2% of titanium. The nickel alloy of the outer metallic tubular 60 provides a suitable resistance per length of 185 Ω/km (56.4 Ω/k') for power and communications transmission. To resist corrosion and abrasion as well as withstand the demands of use in the coiled tubing 24, the outer metallic tubular may also comprise a steel alloy, which has a resistance in Ω/km 35% lower than the nickel alloy. The steel alloy may include corrosion and abrasion resistant alloy referred to as Steel Alloy 316L. The steel alloy of the outer metallic tubular 60 may be a composition of metals comprising 0.03% of carbon, 2.0% of manganese, 0.75% of silicon, 0.045% of phosphorus, 0.03% of sulfur, 16.0 to 18.0% of chromium, 2.0 to 3.0% of molybdenum, 10.0 to 14.0% of nickel, and 0.10% of nitrogen. Although not depicted in the figures, the outer metallic tubular 60 is electrically coupled at the end of the cable 33 to the electrical device 29 in the wellbore 12 and at the surface to ensure that the current flow splits between the two paths.

The cable 33 may be employed to transmit electrical power downhole via the inner metallic tubular 54, the electrically conductive material 56, and the outer metallic tubular 60. As previously discussed, the inner metallic tubular 54 and the electrically conductive material 56 may provide a separate conductive path than the outer metallic tubular 60. The resistance of the outer metallic tubular 60 (e.g., 24 Ω/km or 7.3 Ω/k') may often be higher than the resistance of the inner metallic tubular 54 and the electrically conductive material 56. However, the higher resistance may be improved (i.e., lowered) if a DC or low frequency AC current returns through the outer metallic tubular 60 and also returns through the coiled tubing 24 of FIG. 1. The coiled tubing 24 has a relatively smaller resistance (0.5 Ω/k'). In the examples of FIGS. 2A and 2B, the cable 33 may be mechanically and electrically coupled to the coiled tubing 24 to allow electrical current to pass through the coiled tubing 24. The electrical coupling to the coiled tubing 24 may include, in some examples, mechanical fasteners that mechanically couple the cable 33 and the coiled tubing 24 with the outer metallic tubular 60 and the coiled tubing 24 in electrical contact. In other examples, an electrically conductive medium, such as brazing, soldering, or welding, may be used to mechanically and/or electrically join the outer metallic tubular 60 and the coiled tubing 24. In certain embodiments, the electrical coupling to the coiled tubing 24 may include simply deploying the cable 33 in close proximity (e.g., in direct contact) to the coiled tubing 24.

The cable 33 may also be employed to transmit electrical power and telemetry signals via the inner metallic tubular 54, the electrically conductive material 56, and the outer metallic tubular 60. For telemetry purposes, the cable 33 may be operated in different transmission modes. For example, a telemetry signal may propagate down through the inner metallic tubular 54 and the electrically conductive material 56 and propagate up through the coiled tubing 24.

The telemetry signal includes a frequency and an amplitude that convey information to the electrical device 29 and back to the control unit 44. At a low frequency (e.g., below about 1 kHz), the telemetry signal follows a flow path down through the inner metallic tubular 54 and the electrically conductive material 56, and returns through a return flow path that includes the coiled tubing 24. As the frequency of the telemetry signal increases to a high frequency (e.g., above about 1 kHz), however, electromagnetic forces cause the current to propagate through the outer metallic tubular 60 rather than the coiled tubing 24. The outer metallic tubular 60 exhibits lower magnetic energy than the coiled tubing 24 when the telemetry signals are propagated at higher frequencies.

As stated above, the outer metallic tubular 60 has higher resistance compared to the coiled tubing 24. So a diversion of current from the coiled tubing 24 to the outer metallic tubular 60 may result in signal losses that limit the available signal bandwidth for telemetry applications. Signal losses may be especially encountered for long distance applications, which may occur in production formations 15 at a depth of 5,000 meters (~16,000 feet) or more. Although the electromagnetic waveguides 50 may be operable to convey signals downhole, certain embodiments of cable 33 may use the electromagnetic waveguides to convey optical signals uphole (e.g., from the electrical device 29), while using the inner metallic tubular 54, electrically conductive material 56, and the outer metallic tubular 60 to convey signals downhole (e.g., to the electrical device 29).

Figure 4:
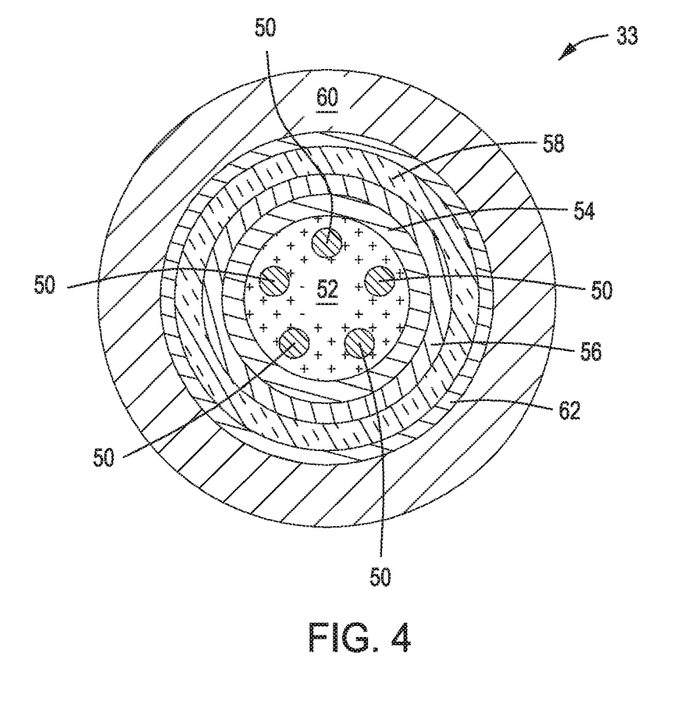
FIG. 4 is a cross-section view of the power and communications cable with an additional electrically conductive layer, according to one or more embodiments.

To further reduce the resistance and improve the power and communications efficiency of signals returning from the electrical device 29, an additional electrically conductive material may be applied to the interior surface of the outer metallic tubular 60. For example, FIG. 4 shows a cross-section view of the cable 33 including an additional electrically conductive material 62 applied between the electrically insulating layer 58 and the outer metallic tubular 60, in accordance with one or more embodiments. As non-limiting examples, the additional electrically conductive material 62 may comprise an electrically conductive cladding of copper, aluminum, silver, or any other suitable conductor applied to the interior surface of the outer metallic tubular 60. The additional electrically conductive material 62 may include conductive tape (e.g., copper tape) applied between the electrically insulating layer 58 and the outer metallic tubular 60. The additional electrically conductive material 62 may also include conductive wires (e.g., copper wires) served or braided over the electrically insulating layer 58 before enclosing the assembly in the outer metallic tubular 60. Employing copper wire or copper tape inside the outer metallic tubular 60 may require increasing the outer diameter of the cable 33, reducing the thickness of the electrically insulating layer 58, or reducing the outer diameter of inner metallic tubular 54. However, a thinner electrically insulating layer 58 may result in reducing power handling capacity and increase the capacitance, reducing a benefit of the lower resistance path at telemetry signals with high frequencies.

In manufacturing the cable 33, one or more layers may each be formed as a structurally separate tubing or concentric layer before combining with another layer. Alternatively, a first layer may be formed and then a second layer may be formed on the first layer. For example, the electrically conductive material 56 may be formed by electroplating or otherwise depositing on the inner metallic tubular 54.

It should be understood that the outer metallic tubular 60 may be an optional protective layer to resist corrosion and abrasion from the fluid encountered in the coiled tubing. The power and communications cable 33 may be employed as an integrated assembly, without the protective layer, including the electromagnetic waveguides 50, the inner metallic tubular 54, the electrically conductive material 56, the electrically insulating layer 58, and the additional electrically conductive material 62.

It should be appreciated that the power and communications cable described herein provides a cable capable of withstanding the harsh environment encountered inside coiled tubing, while offering suitable electrically conductive paths for transmission of power and communications signals. The alloy employed for the outer metallic tubular provides a protective layer for the waveguides to withstand the high pressures and corrosive, abrasive fluids encountered in coiled tubing. With a conductive layer applied inside the outer tubular, the cable 33 provides a suitable conductor for transmission of power and communication signals for downhole electrical equipment such as depicted in FIGS. 3 and 4.

One or more specific embodiments of the power and communications cable and coiled tubing system have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

In addition to the embodiments described above, embodiments of the present disclosure further relate to one or more examples described in the following paragraphs:

An example may include a coiled tubing locatable in a wellbore, a power and communications cable positioned along the coiled tubing. The power and communications cable may include an electromagnetic waveguide, an inner metallic tubular surrounding the electromagnetic waveguide, an electrically conductive material surrounding the inner metallic tubular, an electrically insulating material surrounding the electrically conductive material, and an outer metallic tubular resistant to corrosion and abrasion surrounding the electrically insulating layer. The example system may include an electrical device locatable in the wellbore and coupleable to the cable and a control unit coupleable to the cable and operable to supply power to and communicate with the electrical device via the power and communications cable.

The example of the power and communications cable may include an additional electrically conductive material positioned between the electrically insulating layer and the outer metallic tubular. The additional electrically conductive material may include a resistance that is lower than a resistance of the outer metallic tubular.

Examples of the power and communications cable may include an additional electromagnetic waveguide inside the inner metallic tubular. Examples of the electromagnetic waveguide or the additional electromagnetic waveguide may also include a fiber optic cable. Examples of the outer metallic tubular may include an alloy having nickel, iron, chromium, molybdenum, copper, manganese, and titanium. Examples of the outer metallic tubular may have an outer diameter of between 3 millimeters and 6 millimeters. Examples of the control unit may communicate with the electrical device with a high frequency signal.

Examples of the disclosed embodiments may include a power and communications cable, comprising: an electromagnetic waveguide, an inner metallic tubular surrounding the electromagnetic waveguide, an electrically conductive material surrounding the inner metallic tubular, an electrically insulating material surrounding the electrically conductive material, and an outer metallic tubular resistant to corrosion and abrasion and surrounding the electrically insulating layer.

Examples of the power and communications cable may include an additional electrically conductive material positioned between the electrically insulating layer and the outer metallic tubular. The additional electrically conductive material may include a resistance that is lower than a resistance of the outer metallic tubular. Examples of the power and communications cable may include an additional electromagnetic waveguide inside the inner metallic tubular. The electromagnetic waveguides of these embodiments may include fiber optic cables. Examples of the electrically conductive material may include copper tape. The outer metallic tubular may be made from an alloy comprising nickel, iron, chromium, molybdenum, copper, manganese, and titanium. The outer metallic tubular may have an outer diameter of 3 to 6 millimeters.

Examples of a method of conveying power and communication signals in a wellbore may include sending a first signal along a power and communications cable to an electrical device located downhole in the wellbore, the first signal propagating downhole through an inner metallic tubular surrounding a waveguide within the power and communications cable. The method may include receiving a second signal from the electrical device along the power and communications cable, the second signal propagating uphole through an outer metallic tubular within the power and communications cable. The outer metallic tubular may surround and protect the inner metallic tubular and the waveguide. The second signal may propagate uphole through an additional electrically conductive material positioned around the inner metallic tubular. The method may include receiving a third signal from the electrical device, the third signal propagating through the waveguide. The method may also include receiving a fourth signal from the electrical equipment, the fourth signal propagating through an additional waveguide located within the inner metallic tubular. In certain embodiments, the first signal, the second signal, or both comprise a high frequency signal.

What is claimed is:

1. A method of conveying power and communication signals in a wellbore comprising:

sending a first communication signal along a power and communications cable to an electrical device located downhole in the wellbore, wherein the first communication signal propagates downhole through an inner metallic tubular surrounding a waveguide within the power and communications cable;

receiving a second communication signal from the electrical device along the power and communications cable, wherein the second communication signal propagates uphole through an outer metallic tubular within the power and communications cable, and wherein the outer metallic tubular surrounds and protects the inner metallic tubular and the waveguide; and wherein the second communication signal also propagates uphole through an electrically conductive material positioned around the inner metallic tubular and inside the outer metallic tubular.

2. The method of claim 1, comprising receiving a third communication signal from the electrical device, wherein the third communication signal propagates through the waveguide.

3. The method of claim 2, comprising receiving a fourth communication signal from the electrical equipment, wherein the fourth communication signal propagates through an additional waveguide located within the inner metallic tubular.

4. The method of claim 1, wherein the first communication signal, the second communication signal, or both comprise a high frequency signal.

* * * * *